May 21, 1963 W. PECHTOLD ETAL 3,090,685
METHOD FOR CHARGING DRY GASIFIERS WITH CALCIUM CARBIDE
Filed March 11, 1960
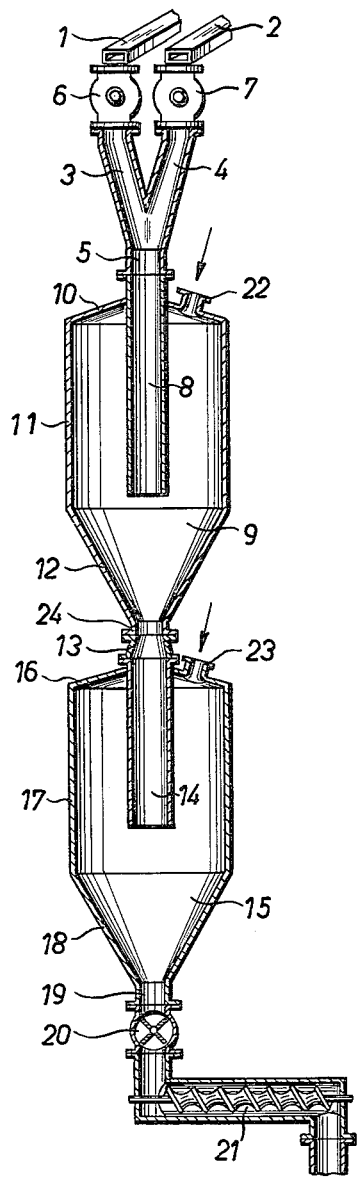
INVENTORS
Walter Pechtold
Andreas Carstensen
Lambert Meyer
Connolly and Hutz
ATTORNEYS

United States Patent Office 3,090,685
Patented May 21, 1963

---

3,090,685
METHOD FOR CHARGING DRY GASIFIERS WITH CALCIUM CARBIDE
Walter Pechtold, Knapsack, near Cologne, Andreas Carstensen, Hermulheim, near Cologne, and Lambert Meyer, Bruhl-Kierberg, Germany, assignors to Knapsack-Griesheim Aktiengesellschaft, Knapsack, near Cologne, Germany, a corporation of Germany
Filed Mar. 11, 1960, Ser. No. 14,235
Claims priority, application Germany Mar. 14, 1959
2 Claims. (Cl. 48—216)

The present invention relates to a charging device for use in calcium carbide dry gasifiers of great capacity, said device being designed to comply with the special demands of this mode of carbide gasification, the behaviour of the acetylene obtained and the operative requirements.

Dry gasifiers were hitherto suplied with ground carbide in the following manner: In a system comprising several tanks which are arranged one above the other or in series and provided with valves, the carbide supplied from a conveying means of appropriate design in caused to travel in predetermined amounts from one tank to the other to the finally introduced into the dry gasifier, the pressure prevailing in the whole plant being maintained by interdependently regulated opening and closing of valves operated by hand or automatically.

The non-uniform properties of carbide and its disintegration in the conveying machinery as well as disturbances at the carbide inlet opening which are due to bridge formations where dust carbide is concerned provide underable disadvantages. In addition thereto, releasing the gas pressures in the alternately operated tanks results in losses of acetylene.

According to a further known proposal the dry gasifiers are provided with independent supply means but this involves the disadvantage that the apparatus is very spacious and expensive. Moreover, they are difficult to control so that the regulation from a central place is very costly.

It has also been proposed to use two storage tanks connected in parallel which are alternately charged and discharged. This arrangement involves the disadvantage that the alternate discharge under pressure and ventilation of these tanks entrain losses of acetylene and that numerous control and operating personnel is necessary.

Another known apparatus comprises a single storage tank from which the carbide is supplied by means of a conveyor screw that is series-connected with a further two conveyer screws for sealing purposes.

The present invention provides a charging device wherein intermediate tanks which are connected with one another serve as storage and control tank and are disposed between the conveyer means for the carbide to be gasified and the dry gasifier.

The storage and control tanks are arranged along the same axis one above the other but eccentrically to and above the dry gasifier. The storage and control tanks are advantageously designed as circular-cylindrical hollow bodies of which the upper and lower parts have the shape of co-axial circular cones. The upper parts have preferably an obtuse angle and the lower parts an acute angle.

The storage and control tanks have a capacity to permit operation for a period of between 30 and 45 minutes.

The upper part of the storage tank is provided with gas tight immersion tube which projects for a substantial distance below the top of the tank into said tank.

The lower part of the storage tank is provided with an outlet tube connected in gas-tight manner to the immersion tube projecting for a substantial distance below the top of the control tank thereinto and connected in gastight manner with said control tank.

The outlet tube disposed at the lower end of the control tank is followed by a gas-tight device which enables predetermined amounts of carbide to be withdrawn (carbide outlet).

The carbide outlet is connected to a gas-tight means (carbide transport means) which serves to transport the carbide withdrawn from the control tank substantially horizontally and to introduce it into the dry gasifier.

The carbide outlet and carbide transport means which conveys the carbide to the dry gasifier are advantageously equipped with speed-controlling driving powers.

The upper parts of the storage and control tanks are provided at a place above the lower outlets of the immersion tubes with gas-tight gas inlet tubes.

The gas inlet tubes are connected to inert gas supply means which can be regulated independently of one another.

The charging device is equipped with a least two alternately operable supply means for the carbide to be gasified.

Y-pipe profiled runways which can alternately be operated are disposed between the carbide supply means and the storage tank, advantageously in an angle of about 70° with respect to the horizontal line.

The upper parts of the Y-pipe profiled runways carry shut-off devices.

The lower common outlet of the Y-pipe profiled runways is connected in gas-tight manner to the immersion tube of the storage tank.

An apparatus suitable for use in this invention is shown diagrammatically in the accompanying drawing wherein the numerals 1 and 2 designate two supply or conveyer means, for example, regulators which are capable of conveying the material in a direction approximately rectangular to the drawing plane.

The carbide supplied travels through shut-off device 6 into Y-pipe 3 or through shut-off device 7 into Y-pipe 4, and is then introduced into short collecting pipe 5 the lower end of which is connected to immersion tube 8.

Immersion tube 8 projects into storage tank 9 which consists of the preferably circular-cylindrical middle section 11, the coaxially arranged circular-conical upper part 10 and circular-conical lower part 12. The top of the conical upper part 10 has preferably an obtuse angle while the lower part 12 is preferably designed to include an angle of between 65° and 85°.

The lower part 12 projects into a short outlet pipe 24 followed by an enlarged intermediate short pipe 13 which is represented in the drawing as truncated cone widening in downward direction. This shape of short pipe 13 has proved especially advantageous but it is not of decisive importance.

Intermediate short pipe 13 is flanged to immersion tube 14 which projects into control tank 15.

Similar to storage tank 9 control tank 15 is preferably a circular-cylindrical hollow body 17 provided with coaxial circular cones that serve as upper part 16 and lower part 18. The upper part 16 of control tank 15 has advantageously an obtuse cone angle while the lower part 12 is preferably designed to include a cone angle of 65–85°.

The inner walls of storage tank 9 and control tank 15 must be smooth, especially in the lower parts of these tanks.

Lower part 18 projects into short outlet pipe 19 which is connected to bucket wheel 20; the latter is responsible for the dosage or amount of the carbide withdrawn. It is advantageous to dispose a shut-off device (not shown in the drawing) between short outlet pipe 19 and bucket wheel 20.

Bucket wheel 20 delivers the carbide to the transport means, for example a conveyer screw, which conveys the material substantially horizontally to the dry gasifier.

Short inlet pipe 22 serves to introduce inert gas into the upper part 10 of storage tank 9 and short inlet pipe 23 into the upper part 16 of control tank 15.

In the storage tank and control tank the inert gas should advantageously be adjusted to and maintained at a pressure amounting to 40% to 60% and 60% to 90%, respectively, of that prevailing in the dry gasifier. The degree of the pressures used is less material than the maintenance of certain pressure conditions. In determining these conditions the grain size, screen spectrum of the carbide to be worked, rate of carbide throughput through the immersion tubes, internal diameter and length of the immersion tubes must be considered in view of the fact that these factors determine the resistance to flow a gas has to overcome within the descending carbide column.

The continuous introduction of ground carbide into apparatus with a dry gasifier must take place with utmost uniformity since otherwise the carbide-water-ratio is shifted which involves irregularities in the operation of the dry gasifier and impairs the quality of the resulting acetylene. The carbide should, therefore, be introduced in a manner such that the acetylene 25%-water vapor 75%-mixture in the dry gasifiers which work at a temperature of about 97° C. under excess pressure does not flash back to the conveyer line to there give rise to bridge formations which involve obstructions or produce local carbide overheating due to partial gasification. In analogous manner, care must be taken to avoid acetylene break-throughs into the series-connected conveyer and storage means which is dangerous and uneconomical. Disturbances should also be avoided because the acetylene evolved generally cannot be stored unless gasometers of extreme dimensions are available. The acetylene production must always be adapted to the requirements of the acetylene withdrawing means.

The penetration of foreign gases which contaminate the acetylene must be avoided as must the escape of acetylene.

The internal diameter of the carbide supply lines must be sufficiently great to comply with the required throughputs. On the other hand, the internal diameter should not be too great since it might then be difficult to maintain the nitrogen pressure.

Disturbances in the conveying means which can never be completely avoided can be overcome by the provision of a certain amount of carbide stock at every dry gasifier without the production being disturbed. A carbide stock sufficient to permit operation for 30–45 minutes will do as experience has shown.

It is, therefore, advantageous to so design the conveyer means that—if one means fails—the other can be connected to a reserve transport system without delay and gas break-through occurring.

Transport means so designed permit the carbide storage tank discharged after failure of one transport line to be recharged at any time without the function of the adjacent apparatus being disturbed.

In order to introduce carbide against the pressure prevailing in the dry gasifier which amounts to about 100 cm. water column and to avoid acetylene break-throughs in upward direction, the storage and control tanks are maintained under an inert gas pressure, for example nitrogen, whereby the inert gas pressures prevailing in the storage and control tanks have to be selected so as to be differently high as stated above so that a pressure gradient from the calcium carbide dry gasifier through the control and storage tanks to the atmosphere is maintained. The acetylene-nitrogen mixture evolved flows against the flow resistance of the contents of the immersion tubes and enables the plant to be tightened with little consumption of inert gas so that only a minimum content of acetylene can appear in the transport lines above the plant. In a plant put into operation the nitrogen consumption amounts, for example, to about 1–3 m.$^3$ per hour while the acetylene content in the transport lines above the storage and control tanks does not exceed 2%, i.e. is below the explosion limits of an acetylene-air mixture.

The amount of gas mixture escaping per unit of time depends on the overpressure of the gas mixture in the cavity, for example, of the control tank above the carbide charge and also depends on the flow resistance which is determined by the heights and cross-sections of the carbide column in the immersion tube and the amount of carbide in the intermediate container below the immersion tube, and by the grain size and screen spectrum of the carbide. The partial pressure of the acetylene in the gas mixture is regulated by introducing inert gas into said cavity.

The inert gas pressures in the storage and control tanks are preferably regulated from a central place, whereby simultaneously the operating conditions of the individual parts of the entire apparatus can readily be controlled. The failure of pressure means that one immersion tube is empty, i.e. that the carbide conveyer means has failed.

This working order may also be indicated in known manner by acoustic means. From this moment, the respective dry gasifier is only supplied with carbide stored in the storage tank. In other words, there is sufficient time within which to set a second carbide conveyer means connected with the storage tank to work from the operating station by simple switching.

The level of carbide in the storage tank which may decrease due to operational disturbances can be re-adjusted without difficulty to its initial position by means of the second carbide conveyer. If, however, the contents of the storage tank, due to extreme carbide properties, such as offered by fine carbide dust, should cease to flow into the control tank after failure of the pressure in the storage tank, the plant continues to operate undisturbed as long as the control tank contains carbide since the latter tank then takes charge of the function of the storage tank. After the second carbide conveyer means has been put into operation, the plant adjusts automatically to the original working conditions.

It is advantageous to provide the apparatus with additional known alarm systems which indicate, for example, the carbide level in the storage tank, or with means for the continuous determination of the acetylene or oxygen content in the carbide conveyer means or for the determination of foreign gases (for example nitrogen) in the acetylene.

The following example serves to illustrate the invention, but it is not intended to limit it thereto:

*Example*

An apparatus designed for a throughput per hour of 8,000 kg. calcium carbide having a grain size of between about 0 to 3 mm. was equipped with immersion tubes 450 mm. in diameter and 2,000 mm. long. The carbide descended in these immersion tubes at a rate of about 100 cm./minute.

The dry gasifier was kept under a pressure of 100 cm. water column while the control tank was kept under a pressure of 60 to 90 cm. water column by nitrogen supply, and the storage tank was kept under a pressure of 40–60 cm. water column.

1–3 m$^3$ nitrogen were consumed per hour. The acetylene content in the atmosphere of the transport lines above the storage and control tanks did not exceed 2%.

We claim:
1. A process for feeding calcium carbide into a dry gasifier which comprises delivering calcium carbide to the top of a storage zone, continuously passing said carbide through an immersion tube which extends to and terminates at a point within said zone located well below the top of said zone whereby a carbide column is established in said zone which has a definite resistance to gas back flow through said column, continuously discharging the carbide from said tube into the portion of said zone below said point of tube termination, permitting the calcium carbide to gravitate from said storage zone to the top of a control zone at a discharge rate which permits a build up of the cabide in the lower part of the storage zone up to the discharge end of said immersion tube, passing said carbide feed to the top of said control zone through a second immersion tube which extends to and terminates at a point within and well below the top of said control zone whereby a carbide column is established in said zone which has a definite resistance to gas back flow through said column, continuously discharging the carbide from said tube into the portion of the control zone below said point of tube termination, withdrawing the carbide from the bottom of said control zone at a rate which permits a build up of the carbide in the lower part of said control zone up to the discharge end of said immersion tube, the rate of delivery of carbide to the storage zone corresponding to the rate of withdrawal of carbide from said control zone, introducing an inert gas above the levels of the carbide confined in said two zones, maintaining said inert gas in the storage zone at a pressure amounting to about 40–60% of the overpressure prevailing in the dry gasifier, and maintaining said inert gas in the control zone at a pressure amounting to about 60–90% of the overpressure prevailing in the dry gasifier, said inert gas pressure aiding in sealing off of the immersion columns against back flow of gas from the dry gasifier by exerting pressure against the carbide in the columns to compact said carbide.

2. The process of claim 1, wherein nitrogen is used as the inert gas.

References Cited in the file of this patent
UNITED STATES PATENTS

| | | |
|---|---|---|
| 2,415,328 | Anderson | Feb. 4, 1947 |
| 2,767,130 | Bearer | Oct. 16, 1956 |
| 2,846,367 | Lifland | Aug. 5, 1958 |
| 2,899,283 | Hennigan | Aug. 11, 1959 |
| 2,952,623 | McClure | Sept. 13, 1960 |